Dec. 15, 1925.  
C. A. MYERS  
1,566,251  
TIRE VULCANIZING APPARATUS  
Filed Aug. 1, 1918  
5 Sheets-Sheet 1
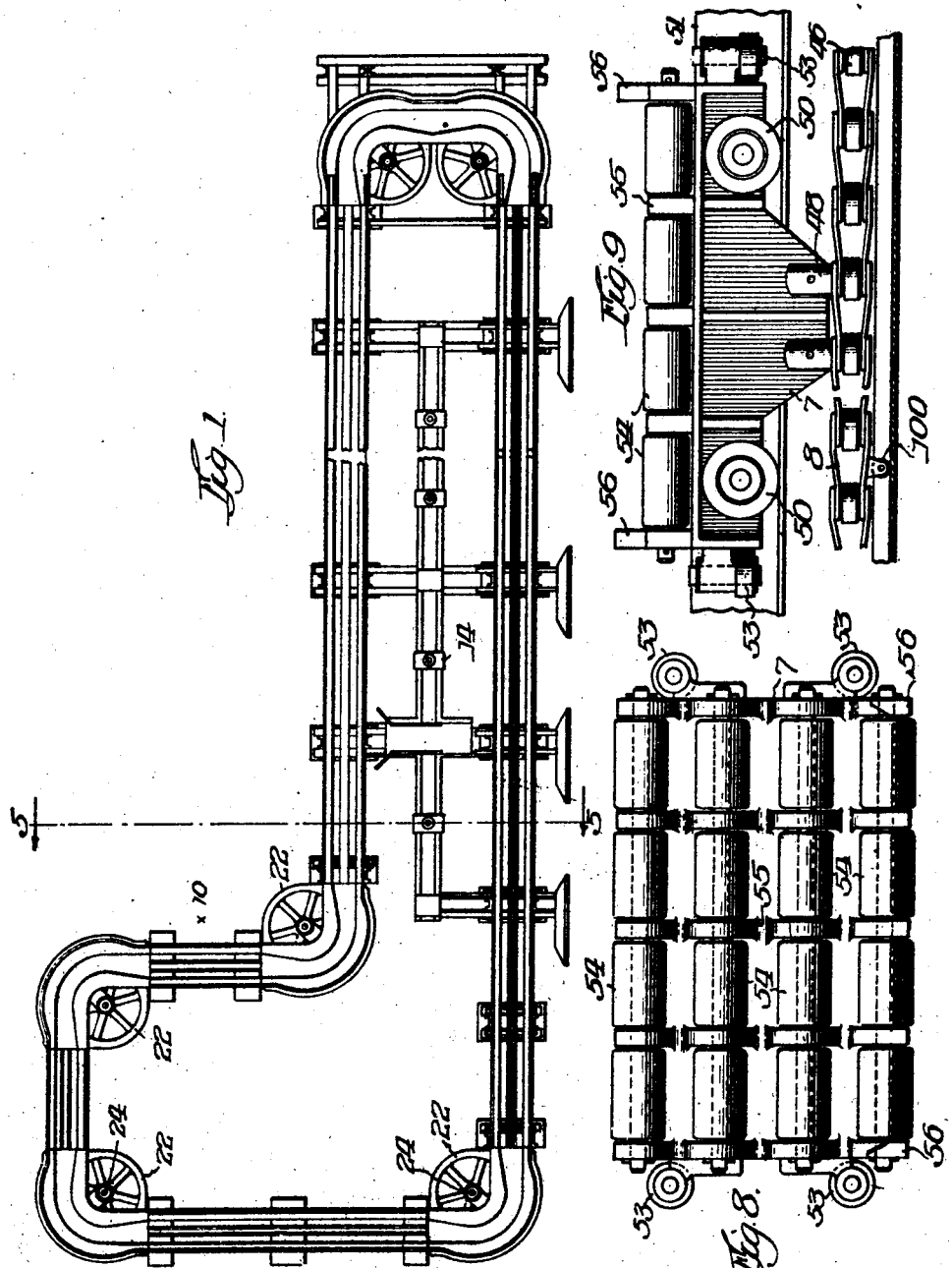

Dec. 15, 1925.  
C. A. MYERS  
TIRE VULCANIZING APPARATUS  
Filed Aug. 1, 1918  
1,566,251
5 Sheets-Sheet 2
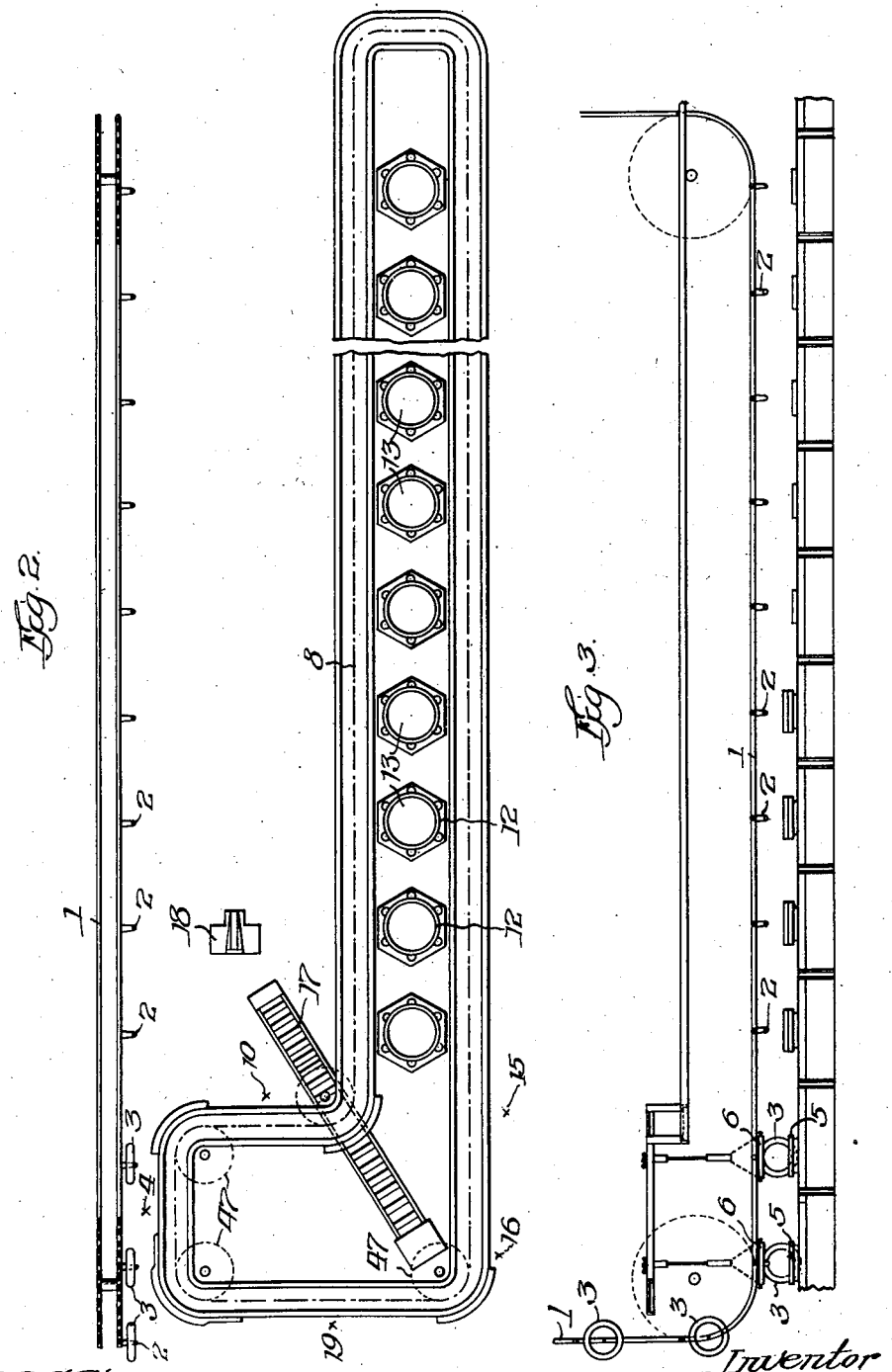

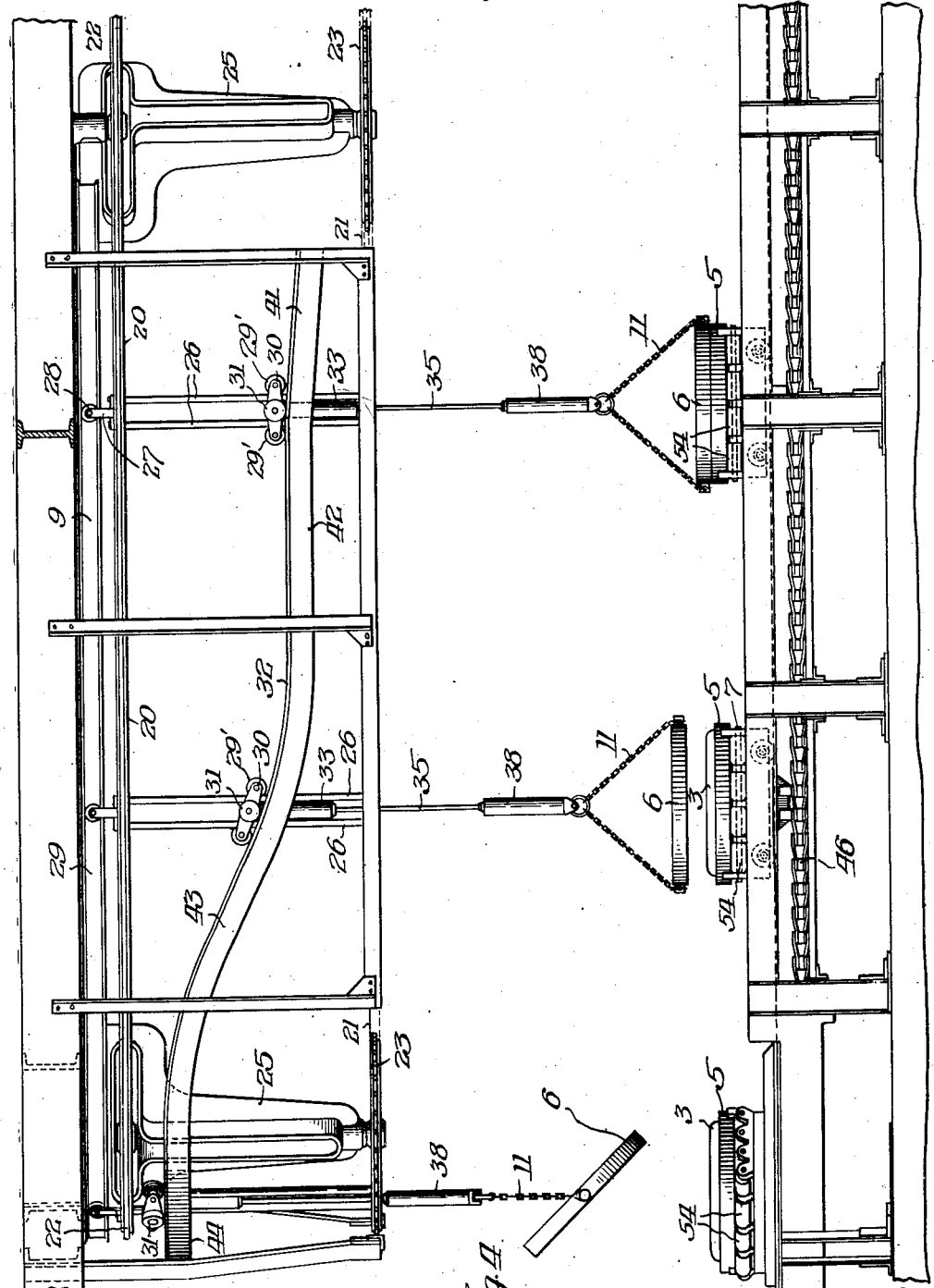

Dec. 15, 1925.  
C. A. MYERS  
TIRE VULCANIZING APPARATUS  
Filed Aug. 1, 1918 5 Sheets-Sheet 4
1,566,251
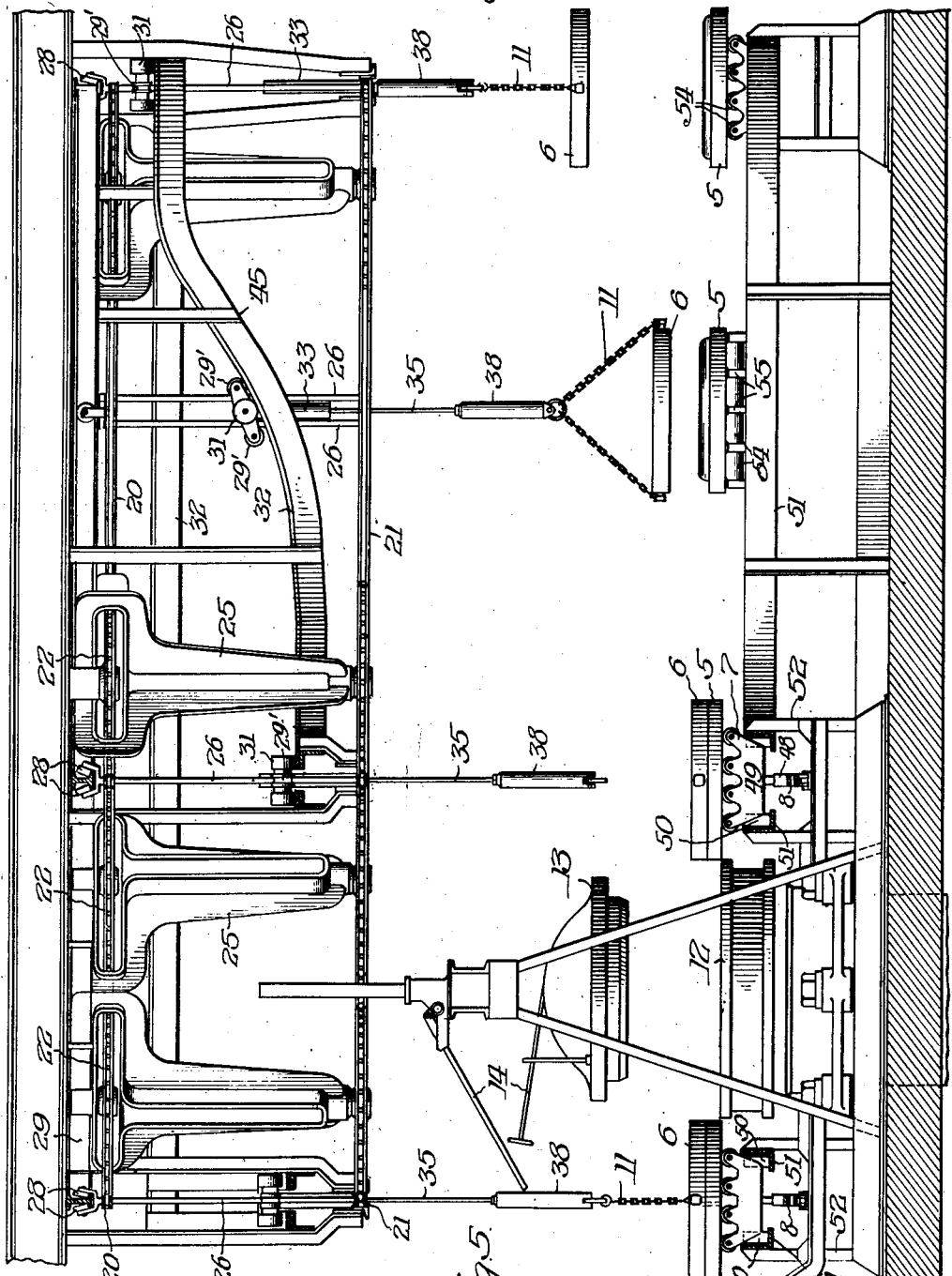

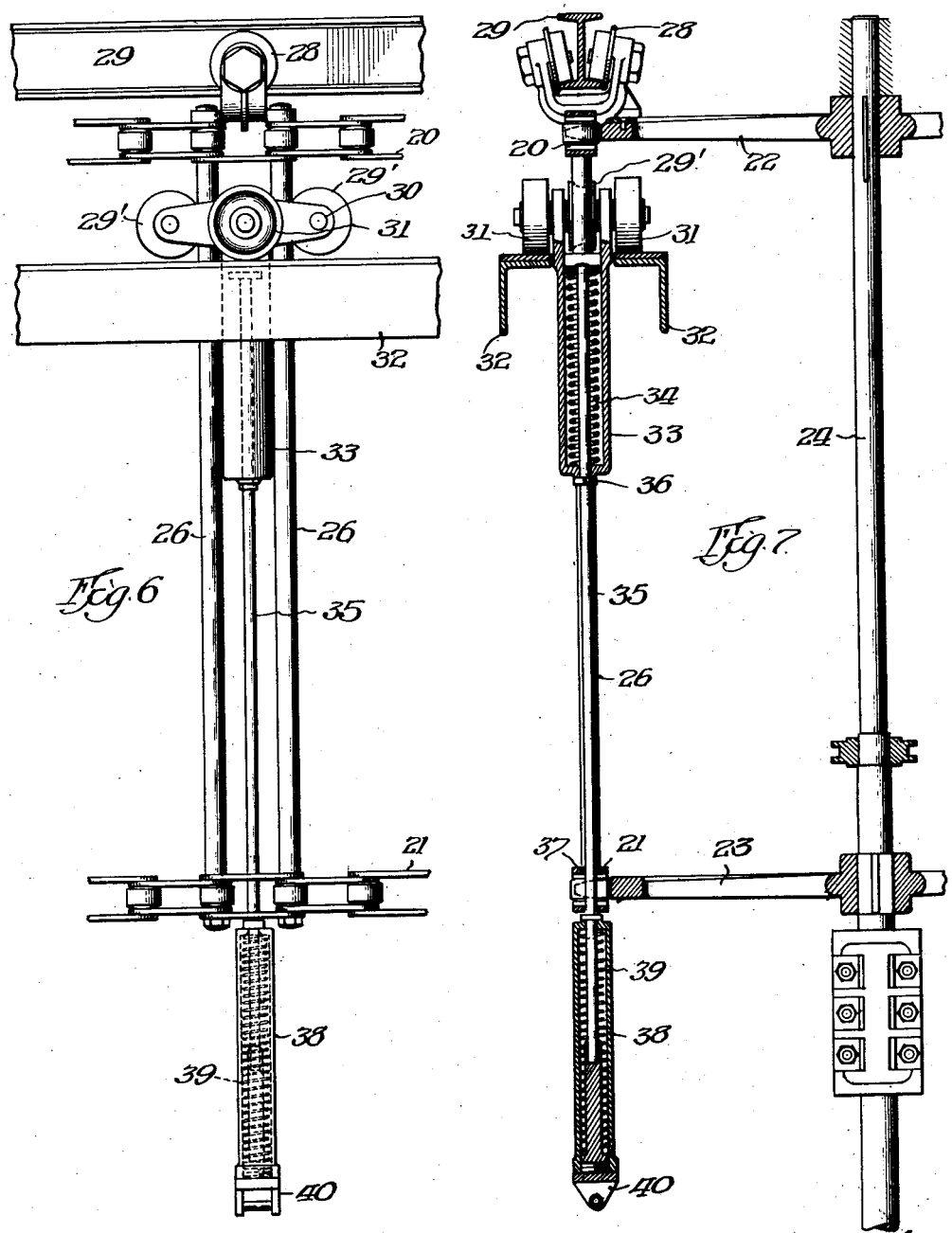

Patented Dec. 15, 1925.

1,566,251

UNITED STATES PATENT OFFICE.

CARMON A. MYERS, OF AKRON, OHIO, ASSIGNOR TO FIRESTONE TIRE AND RUBBER COMPANY, OF AKRON, OHIO, A CORPORATION OF OHIO.

TIRE-VULCANIZING APPARATUS.

Application filed August 1, 1918. Serial No. 247,770.

*To all whom it may concern:*

Be it known that I, CARMON A. MYERS, a citizen of the United States, and a resident of Akron, Summit County, State of Ohio, have invented certain new and useful Improvements in Tire-Vulcanizing Apparatus, of which the following is a specification.

The invention relates to an apparatus for use in vulcanizing tires and comprises a system of conveyors and mold handling apparatus whereby the uncured tires may be gotten into the molds, the molds moved into and out of the presses or heaters and the tires removed in the shortest possible time. By means of the apparatus shown herein the maximum efficiency may be obtained in the curing of tires and this operation, which has formerly been expensive and laborious, may be performed quickly and easily.

In the drawings accompanying this application is shown one embodiment of the apparatus, which is susceptible of alteration within the scope of the invention. In the drawings:

Fig. 1 is a plan view of the conveyor system taken above the mold lid lifting conveyor.

Fig. 2 is a plan taken at the plane of the presses.

Fig. 3 is a diagrammatic side elevation.

Fig. 4 is a side elevation of the apparatus at the point where the mold is opened to remove the finished tire.

Fig. 5 is a cross section on the line 5—5 of Fig. 1 looking in the direction of the arrows.

Fig. 6 is an enlarged side elevation of one of the mold lid conveyors.

Fig. 7 is a vertical section of the same.

Fig. 8 is a plan of the mold carriage.

Fig. 9 is an elevation of the same.

The apparatus is a composite mechanism for handling the tires from the time they are ready to be cured until they are in condition to be stripped from the cores. In the factory construction of which this apparatus is designed as a part, the presses or heaters in which the tires are cured are located on a floor below the one in which the tires are "finished" by which is meant that the building of the tire has been completed and it is ready for the curing operation. From the tire finishing room, wherever located, is brought a chain conveyor 1 from which are suspended by hooks the completed tires 3. This conveyor is arranged to pass a portion of a conveyor which carries the molds to and from the heaters at a point which may be termed the loading station 4 and at which point the cores and tires are removed from the conveyor 1 and placed in the molds.

Before entering into a detailed description of the mold conveying apparatus, a brief statement of the operations which the tire and mold undergo will be beneficial. At the station 4, the molds which comprise a lower portion 5 and an upper portion or lid 6, are open, the lid being held above the remainder of the mold by a chain conveyor, to be described. The bottom half of the mold is supported in any preferred manner, preferably on a carriage 7 secured to a conveyor 8 and the lid is, during the period when the mold is opened, carried on a conveyor 9 and is moving at the same speed. At this point it may be noted that the tire conveyor 1 is run in synchronism with the conveyors 8 and 9. The conveyors 8 and 9 and the conveyor 1 may be run continuously or intermittently as desired.

The carriage shown herein is the invention of one Lee R. McGuire and is claimed in his copending application Serial No. 255,102, filed September 21, 1918.

During the period of travel by the station 4 an operator removes a core and green tire from the conveyor 1 and deposits it in the lower half of the mold which is passing at that time on the carriage 7. The conveyor 9 now lowers the lid 6 on to the mold at the point 10 as shown in Figs. 2 and 5. At this point an operator registers the two halves of the molds and releases the chains 11 which have supported the lid. The conveyor 8 is arranged to pass down one side of a row of presses or heaters 12 in which the tires are cured. These presses may be of any desired type, but are preferably vertical hydraulic presses which are provided with lids 13 which are arranged to be raised and lowered by any suitable means, preferably by fluid actuated lifts shown at 14. The number and capacity of the presses is so arranged that at least one will be in the process of filling and another in the process of emptying at all times.

As the mold on the conveyor comes opposite the press which is being filled an operator pulls the mold off the conveyor into the press. When the press is filled the operator replaces the lid and manipulates the various valve mechanisms to effect the curing operations.

At the same time one of the other presses is being emptied and the molds are pulled out of the pit and placed on carriages on the return trip of the conveyor. As the molds approach the station 15 another operator fastens the chains 11 on the mold tops and "cracks" the mold, that is, starts the molds with a crow bar, or other implement. The top of the mold is elevated by the conveyor 9 and the tire and core are removed from the mold at the station 16, being placed on a conveyor 17 which takes the tire to tire stripping machine 18. The conveyor now passes the point 19 where the top and bottom are scoured and cleaned preparatory to receiving a fresh tire.

As briefly outlined above it will be seen that the arrangement is such that tires can be handled with great rapidity and loss of time is reduced to a minimum.

The lid conveying mechanism comprises two parallel chains arranged one above the other, the upper one being designated at 20, the lower at 21 which are carried on sets of sprockets 22 and 23 respectively, arranged on vertical shafts 24 supported on hangers 25 at suitable points. At spaced intervals between the chains there are arranged parallel tie rods 26 above which is a head 27 carrying the weight of the chains on rollers 28 riding on I-beam 29.

Guided by the tie-rods 26 are arranged rollers 29' which are carried on a truck 30 supported by rollers 31 on parallel tracks 32 on opposite sides of the chain 20. From the truck 30 is suspended a tube 33 in which is supported a heavy coil spring 34 which carries a lid lifting rod 35, upward movement thereof being limited by a collar 36. The lifting rod passes through apertures 37 in links of the chain 21, and carries at its lower end a sleeve 38, a spring 39 being interposed between the sleeve and the rod. The end of the sleeve 38 is formed with a clevis 40 from which the chains 11 are suspended. It will be seen that the tracks 32 are utilized to raise and lower the lid of the mold and for this purpose are provided with a slight upward incline as at 41 in Fig. 4 which is at the station 15 Fig. 2 where the chains are placed about the top of the mold and the mold cracked. The purpose of the slight incline is to enable the chains 11 to be drawn tight before the mold is cracked, the springs 39 serving to give the proper tension to the chains. The spring 34 is strong enough to support the weight of the top alone, but if through accident the mold should not be cracked, the spring will give under the weight of the mold and the tire and the entire unit will not rise off the conveyor 8. A comparatively level stretch 42 is provided in the trackway 32 during which the operator is given ample time to crack the mold. The track then ascends as at 43 to a higher level 44 which it maintains until the position 10 is reached at which point it descends, as at 45, Fig. 5, to close the mold. During the elevation at 44, the tire is removed and the mold and lid are scoured and cleaned and a new tire is placed on the mold.

The lower conveyor 8 comprises a chain 46 supported at intervals by small rollers 100 and passing around sprockets 47, the chain carrying at intervals directly under the rods 35 arms 48 secured to the under side of a truck 49 which operates as the mold carriage. The weight of the truck is carried on rollers 50 riding on angle irons 51 supported by a frame work 52. Small rollers 53 are carried on the ends of the trucks or cars and guide them in moving around the corners. The car is formed of a series of rollers 54 supported on a gridwork 55 which constitutes the frame of the car. At the side of the car, remote from the presses, is a pair of stops 56 which serve to center the mold on the carriage. This particular construction of the car is preferred as the molds are very heavy and must be capable of sliding on to and off the conveyor with as little effort as possible.

The operation has been clear as the description proceeded and it is not believed to be necessary to review it at this point. The apparatus makes possible a more efficient handling of molds and will reduce the number of men and confusion incident in the curing operation. The conveyor in combination with the row of presses and the opening mechanism will produce a maximum number of tires in a given time, and when taken in connection with the delivery conveyor and the conveyor for removing the cured tires, there is presented an apparatus which will cheapen the production of automobile tires.

In place of the springs in the lid carrying rods, equivalent mechanism may be employed.

Other changes and modifications may be made without departing from the spirit of the invention or without altering the scope thereof within the limits of the claims.

I claim:

1. In an apparatus for vulcanizing tires or the like, the combination of a series of vulcanizers, a loading station and an unloading station, a conveyor leading from said loading station to said vulcanizers and to the unloading station and means for opening the molds while they are moving and before they reach the unloading station.

2. In an apparatus for vulcanizing tires or the like, the combination of a series of vulcanizers, a loading station, a conveyor leading from said station to the vulcanizers, and means for closing the mold while it is in motion and before it reaches the vulcanizers.

3. In an apparatus for vulcanizing tires or the like, the combination of a series of vulcanizers, a loading station, a continuously moving conveying mechanism, means for closing the mold on the mechanism between the loading station and the vulcanizers, and means for opening the molds on the mechanism after leaving the vulcanizers.

4. In an apparatus for vulcanizing tires or the like, an endless conveyor, a series of vulcanizers adjacent one section of the conveyor, the said conveyor passing the vulcanizers, a second conveyor, lid engaging members on said second conveyor, and means for elevating the lids and replacing them during the travel of said second conveyor.

5. In an apparatus for vulcanizing tires or the like, a series of vulcanizers arranged in a row, an endless conveyor passing the vulcanizers, a mold moving element on said conveyor, a second conveyor above the first named conveyor, a lid lifter carried in said second conveyor over the mold in said conveyor and means to operate the lifting apparatus to raise the lids of the molds during that portion of the travel of the conveyor remote from the vulcanizers.

6. In an apparatus of the character set forth, an open top vulcanizer in which a plurality of molds may be received, conveying mechanism at the side of the vulcanizer, a mold moving element on the conveying mechanism, and means movable in synchronism with the conveyor to raise and lower the mold lid while the mold is in motion.

7. In an apparatus of the character set forth, an open top vulcanizer, conveying mechanism adjacent the vulcanizer, a mold moving element on the conveying mechanism, a second conveyor over the first conveyor, means to move the two conveyors at the same speed, and a mold lid carrying and elevating mechanism on the second conveyor.

8. In an apparatus of the character set forth, a row of open top vulcanizers, a horiconveyor at the side of the vulcanizer, means for moving a mold on the conveyor, a second conveyor above the first conveyor, means to move the two conveyors in synchronism, a lid carrying device on the second conveyor, and means to raise and lower the device during the movement of the conveyor.

9. In an apparatus of the character set forth, a row of open top vulcanizers, a horizontal conveyor passing along the row, means on said conveyor adapted to support a mold, a second conveyor above the first conveyor, a vertically movable truck on said conveyor, supporting means for the mold lid carried on the truck and means to move the two conveyors in unison.

10. In an apparatus of the character set forth, a tire conveyor, and a mold conveyor near the discharge point of the tire conveyor, a mold lid conveyor, said lid conveyor being arranged to raise and lower the lids on the molds, and a series of vulcanizing presses adjacent the path of the mold conveyor.

11. In an apparatus of the character set forth, a green tire conveyor, a mold conveyor adjacent the green tire conveyor at one point, a mold lid conveyor arranged to raise the lid from the mold and lower it when the mold has passed the green tire conveyor, and a series of presses adjacent which the conveyor passes.

12. In an apparatus of the character set forth, a green tire conveyor, a mold conveyor adjacent the green tire conveyor at one point, a mold lid conveyor arranged to raise the lid from the mold and lower it when the mold has passed the green tire conveyor, a series of presses which the conveyor passes, and a conveyor for removing the vulcanized tire.

13. In an apparatus for handling molds a conveyor for moving the molds horizontally, a track above the path of the conveyor, the track having two levels and inclined portions connecting said levels, means adapted to carry a mold lid supported on the track and movable in synchronism with said conveyor.

14. In an apparatus for handling molds, a conveyor for moving the molds horizontally, a series of vulcanizers adjacent which the conveyor moves, a track above the conveyor having two levels, inclined portions connecting the two levels and means to carry the mold lid supported on the track and movable with the mold on the conveyor.

15. In an apparatus for handling molds, a horizontal conveyor for the mold, a rod, means carried by the rod to engage the lid of the mold a yielding connection in the rod, means to raise the rod, and means to put the connection under stress before the rod is raised.

16. In an apparatus for handling molds, a horizontal conveyor for the mold, a rod, a spring supported on the lower end of the rod, mold carrying means supported on the spring, means for moving the rod in unison with the conveyor, and means for raising and lowering the rod.

17. In an apparatus for handling molds, a horizontal conveyor for the mold, a rod, a spring supported on the lower end of the rod, mold carrying means supported on the spring, means for moving the rod in unison with the conveyor means for raising and lowering the rod, and means for placing the spring under tension.

18. In an apparatus for handling tire molds, a horizontally movable mold supporting conveyor, a horizontally movable mold lid supporting mechanism, means to raise and lower the supporting mechanism, and a spring in the supporting mechanism which is strong enough to support the lid but will give under the load of the mold and lid.

19. In an apparatus of the character described, the combination of a conveyor for molds, a vulcanizer adapted to contain a plurality of molds, said conveyor passing beside the vulcanizer, and means traveling in synchronism with the conveyor to separate the mold sections while on said conveyor.

20. In an apparatus of the character described, the combination of a conveyor for sectional molds, a vulcanizer adapted to receive a plurality of said molds at a single cure, said conveyor passing beside the vulcanizer, and means traveling in synchronism with the conveyor to raise the upper half of said molds while on the conveyor.

21. In an apparatus of the character described, the combination of a conveyor for molds, a plurality of vulcanizers, each adapted to contain a plurality of molds said conveyor passing alongside of said vulcanizers, and means traveling in synchronism with the conveyor to separate the mold sections while on said conveyor.

22. In an apparatus of the character described, the combination of a conveyor for sectional molds, a plurality of vulcanizers, each adapted to receive a plurality of molds, said conveyor passing alongside of said vulcanizers, and means traveling in synchronism with the conveyor to raise the upper half of said molds while on the conveyor.

23. In an apparatus of the character set forth, an open top vulcanizer, a horizontal mold conveyor at the side of the vulcanizer, a second conveyor above the first conveyor means to move the two conveyors simultaneously so as to register the mold sections at the lifting and lowering points, a lid carrying device on the second conveyor and means to raise and lower the device during the movement of the conveyor.

CARMON A. MYERS.